United States Patent
Niemi et al.

(10) Patent No.: US 11,570,834 B2
(45) Date of Patent: Jan. 31, 2023

(54) PROTOCOL IMPROVEMENT FOR REDIRECTION TO ANOTHER SYSTEM IN MOBILE COMMUNICATIONS

(71) Applicant: MediaTek Singapore Pte. Ltd., Singapore (SG)

(72) Inventors: Marko Niemi, Oulu (FI); Matti Moisanen, Oulu (FI)

(73) Assignee: MediaTek Singapore Pte. Ltd., Singapore (SG)

(*) Notice: Subject to any disclaimer, the term of this patent is extended or adjusted under 35 U.S.C. 154(b) by 50 days.

(21) Appl. No.: 17/193,131

(22) Filed: Mar. 5, 2021

(65) Prior Publication Data

US 2021/0321477 A1  Oct. 14, 2021

Related U.S. Application Data

(60) Provisional application No. 63/007,384, filed on Apr. 9, 2020, provisional application No. 63/023,902, filed on May 13, 2020, provisional application No. 63/023,908, filed on May 13, 2020, provisional application No. 63/035,082, filed on Jun. 5, 2020.

(51) Int. Cl.
*H04W 4/00* (2018.01)
*H04W 76/18* (2018.01)
*H04W 48/16* (2009.01)
*H04W 88/04* (2009.01)

(52) U.S. Cl.
CPC ........... *H04W 76/18* (2018.02); *H04W 48/16* (2013.01); *H04W 88/04* (2013.01)

(58) Field of Classification Search
CPC ..... H04W 76/18; H04W 48/16; H04W 48/18; H04W 48/20; H04W 48/12; H04W 88/06

USPC ......................................................... 455/434
See application file for complete search history.

(56) References Cited

U.S. PATENT DOCUMENTS

2019/0373473 A1* 12/2019 Kemppainen ......... H04W 12/12

FOREIGN PATENT DOCUMENTS

| CN | 110447250 A | 11/2019 |
|---|---|---|
| EP | 3629640 A1 | 4/2020 |
| TW | 201944795 A | 11/2019 |
| TW | 202005437 A | 1/2020 |

OTHER PUBLICATIONS

Taiwan Intellectual Property Office, Office Action for Taiwan Patent Application No. 110110360, dated Nov. 8, 2021.

* cited by examiner

*Primary Examiner* — Temica M Beamer
(74) *Attorney, Agent, or Firm* — Han IP PLLC; Andy M. Han (57) ABSTRACT

Examples pertaining to protocol improvement for redirection to another system in mobile communications are described. An apparatus in a 5th Generation System (5GS) receives, from a mobile network, a reject cause indicating that redirection to an Evolved Packet System (EPS) is required. Responsive to receiving the reject cause while no suitable cell of the first mobile network connected to an Evolved Packet Core (EPC) is found or while no cell of the first mobile network connected to an EPC can be selected, the apparatus enters a predefined 5th Generation Mobility Management (5GMM) state and starts a timer.

6 Claims, 4 Drawing Sheets

RECEIVE, BY A PROCESSOR OF AN APPARATUS IN A 5<sup>TH</sup> GENERATION SYSTEM (5GS), FROM A FIRST MOBILE NETWORK A REJECT CAUSE INDICATING THAT REDIRECTION TO AN EVOLVED PACKET SYSTEM (EPS) IS REQUIRED
310

PERFORM, BY THE PROCESSOR, OPERATIONS RESPONSIVE TO RECEIVING THE REJECT CAUSE WHILE NO SUITABLE CELL OF THE FIRST MOBILE NETWORK CONNECTED TO AN EVOLVED PACKET CORE (EPC) IS FOUND OR CAN BE SELECTED
320

ENTER A PREDEFINED 5<sup>TH</sup> GENERATION MOBILITY MANAGEMENT (5GMM) STATE
322

START A TIMER
324

PROTOCOL IMPROVEMENT FOR REDIRECTION TO ANOTHER SYSTEM IN MOBILE COMMUNICATIONS

CROSS REFERENCE TO RELATED PATENT APPLICATION(S)

The present disclosure is part of a non-provisional application claiming the priority benefit of U.S. Patent Application Nos. 63/007,384, 63/023,902, 63/023,908 and 63/035,082, filed on 9 Apr. 2020, 13 May 2020, 13 May 2020 and 5 Jun. 2020, respectively, the contents of which being incorporated by reference in their entirety.

TECHNICAL FIELD

The present disclosure is generally related to mobile communications and, more particularly, to protocol improvement for redirection to another system in mobile communications.

BACKGROUND

Unless otherwise indicated herein, approaches described in this section are not prior art to the claims listed below and are not admitted as prior art by inclusion in this section.

In wireless communications such as mobile communications according to the $3^{rd}$ Generation Partnership Project (3GPP) specifications, mobility management (MM) cause #31 is sent to a user equipment (UE) in case the UE requests for a service in a public land mobile network (PLMN) in a system (e.g., an Evolved Packet System (EPS) or a $5^{th}$ Generation System (5GS)) where the UE, by operator policy, is not allowed to receive the service and is requested to redirect to another system (e.g., 5GS or EPS). In 5GS, in case a registration request is rejected due to core network (CN) redirection for cellular Internet of Things (CIoT) optimizations, the network would set the $5^{th}$ Generation mobility management (5GMM) cause value to #31 "Redirection to EPC required." The network could take into account the UE's S1 mode capability (EPS), with the EPS CIoT network behavior supported by the UE or the EPS CIoT network behavior supported by the EPC to determine the rejection with the 5GMM cause value #31 "Redirection to EPC required." In EPS, in case a tracking area update (TAU) request is rejected due to core network redirection for CIoT optimizations, the network would set the EPS Mobility Management (EMM) cause value to #31 "Redirection to 5GCN required." The network could take into account the UE's N1 mode capability (5G), with the 5GS CIoT network behavior supported by the UE or the 5GS CIoT network behavior supported by the $5^{th}$ Generation core network (5GCN) to determine the rejection with the EMM cause value #31 "Redirection to 5GCN required."

When the UE receives cause #31, the UE would set the 5GS update status to 5U3 ROAMING NOT ALLOWED and would delete any $5^{th}$ Generation globally unique temporary identifier (5G-GUTI), last visited registered tracking area identifier (TAI), TAI list, and 5G key set identifier (ngKSI). Additionally, the UE would reset the registration attempt counter and enter the state of 5GMM-DEREGISTERED. The UE would enable the Evolved Universal Terrestrial Radio Access (E-UTRA) capability in case it was disabled, and the UE would disable the N1 mode capability for 3GPP access. In case lower layers cannot find a suitable E-UTRA cell connected to an Evolved Packet Core (EPC) or there is no suitable E-UTRA cell connected to an EPC which supports CIoT EPS optimizations that are supported by the UE, the UE may re-enable the N1 mode capability for 3GPP access, and the UE may also indicate to lower layers to remain camped in E-UTRA connected to the 5GCN of the previously registered PLMN and proceed with the appropriate 5GMM procedure.

In an event that N1 capability is re-enabled, the UE may enter back to the same PLMN where cause #31 was received. However, there could be some problems. A first problem would be that, in case the UE cannot find service (e.g., a suitable cell in another system), the UE may enter the same PLMN where it received cause #31. At registration the UE would receive cause #31 again, thereby disabling the mode once again. As a result, the UE would ping-pong between different systems. A second problem would be that, in case the UE receives cause #31 from both systems (possibly from different PLMNs), the UE would need to determine whether to select another PLMN next time to avoid future occurrence of the ping-pong scenario. A third problem would be that, in case a mode (e.g., N1 mode) is re-enabled after disabling due to no service in another system, the UE would not know what the appropriate MM procedure in the mode would be if not registration mode. A fourth problem would be that, in case a mode (e.g., N1 mode) is re-enabled after disabling due to no service in another system, the UE would not know what the previously registered PLMN where the UE should remain camped would be when the previous registration was rejected with cause #31. Moreover, the PLMN sending cause #31 cannot be added in the "forbidden PLMN list" because the same list is used for 3GPP access, EMM, General Packet Radio Service (GPRS) mobility management (GMM) and MM, and the UE may obtain service from other access/system in that PLMN.

Therefore, there is a need for a solution with improvement to existing protocol when redirection of a UE to another system is required.

SUMMARY

The following summary is illustrative only and is not intended to be limiting in any way. That is, the following summary is provided to introduce concepts, highlights, benefits and advantages of the novel and non-obvious techniques described herein. Select implementations are further described below in the detailed description. Thus, the following summary is not intended to identify essential features of the claimed subject matter, nor is it intended for use in determining the scope of the claimed subject matter.

An objective of the present disclosure is to propose schemes, designs, concepts, techniques, methods, systems and apparatus to address aforementioned issues. Specifically, various proposed schemes in accordance with the present disclosure pertain to protocol improvement for redirection to another system in mobile communications.

In one aspect, a method may involve a processor of an apparatus in a $5^{th}$ Generation System (5GS) receiving, from a mobile network, a reject cause indicating that redirection to an EPS is required. Responsive to receiving the reject cause while no suitable cell of the first mobile network connected to an EPC is found or while no cell of the first mobile network connected to an EPC can be selected, the method may also involve the processor entering a predefined 5GMM state and starting a timer.

In another aspect, a method may involve a processor of an apparatus in an EPS receiving, from a mobile network, a reject cause indicating that redirection to a 5GS is required.

Responsive to receiving the reject cause while no suitable cell of the first mobile network connected to a 5GCN is found or while no cell of the first mobile network connected to a 5GCN can be selected, the method may also involve the processor entering a predefined EMM state and starting a timer.

It is noteworthy that, although description provided herein may be in the context of certain radio access technologies, networks and network topologies such as 5G/NR mobile networking, the proposed concepts, schemes and any variation(s)/derivative(s) thereof may be implemented in, for and by other types of wireless and wired communication technologies, networks and network topologies such as, for example and without limitation, Ethernet, Evolved Packet System (EPS), Universal Terrestrial Radio Access Network (UTRAN), Evolved UTRAN (E-UTRAN), Global System for Mobile communications (GSM), General Packet Radio Service (GPRS)/Enhanced Data rates for Global Evolution (EDGE) Radio Access Network (GERAN), Long-Term Evolution (LTE), LTE-Advanced, LTE-Advanced Pro, Internet-of-Things (IoT), Narrow Band Internet of Things (NB-IoT), and any future-developed networking technologies. Thus, the scope of the present disclosure is not limited to the examples described herein.

BRIEF DESCRIPTION OF THE DRAWINGS

The accompanying drawings are included to provide a further understanding of the disclosure and are incorporated in and constitute a part of the present disclosure. The drawings illustrate implementations of the disclosure and, together with the description, serve to explain the principles of the disclosure. It is appreciable that the drawings are not necessarily in scale as some components may be shown to be out of proportion than the size in actual implementation in order to clearly illustrate the concept of the present disclosure.

DETAILED DESCRIPTION OF PREFERRED IMPLEMENTATIONS

Detailed embodiments and implementations of the claimed subject matters are disclosed herein. However, it shall be understood that the disclosed embodiments and implementations are merely illustrative of the claimed subject matters which may be embodied in various forms. The present disclosure may, however, be embodied in many different forms and should not be construed as limited to the exemplary embodiments and implementations set forth herein. Rather, these exemplary embodiments and implementations are provided so that description of the present disclosure is thorough and complete and will fully convey the scope of the present disclosure to those skilled in the art. In the description below, details of well-known features and techniques may be omitted to avoid unnecessarily obscuring the presented embodiments and implementations.

Overview

Implementations in accordance with the present disclosure relate to various techniques, methods, schemes and/or solutions pertaining to protocol improvement for redirection to another system in mobile communications. According to the present disclosure, a number of possible solutions may be implemented separately or jointly. That is, although these possible solutions may be described below separately, two or more of these possible solutions may be implemented in one combination or another.

Figure 1:
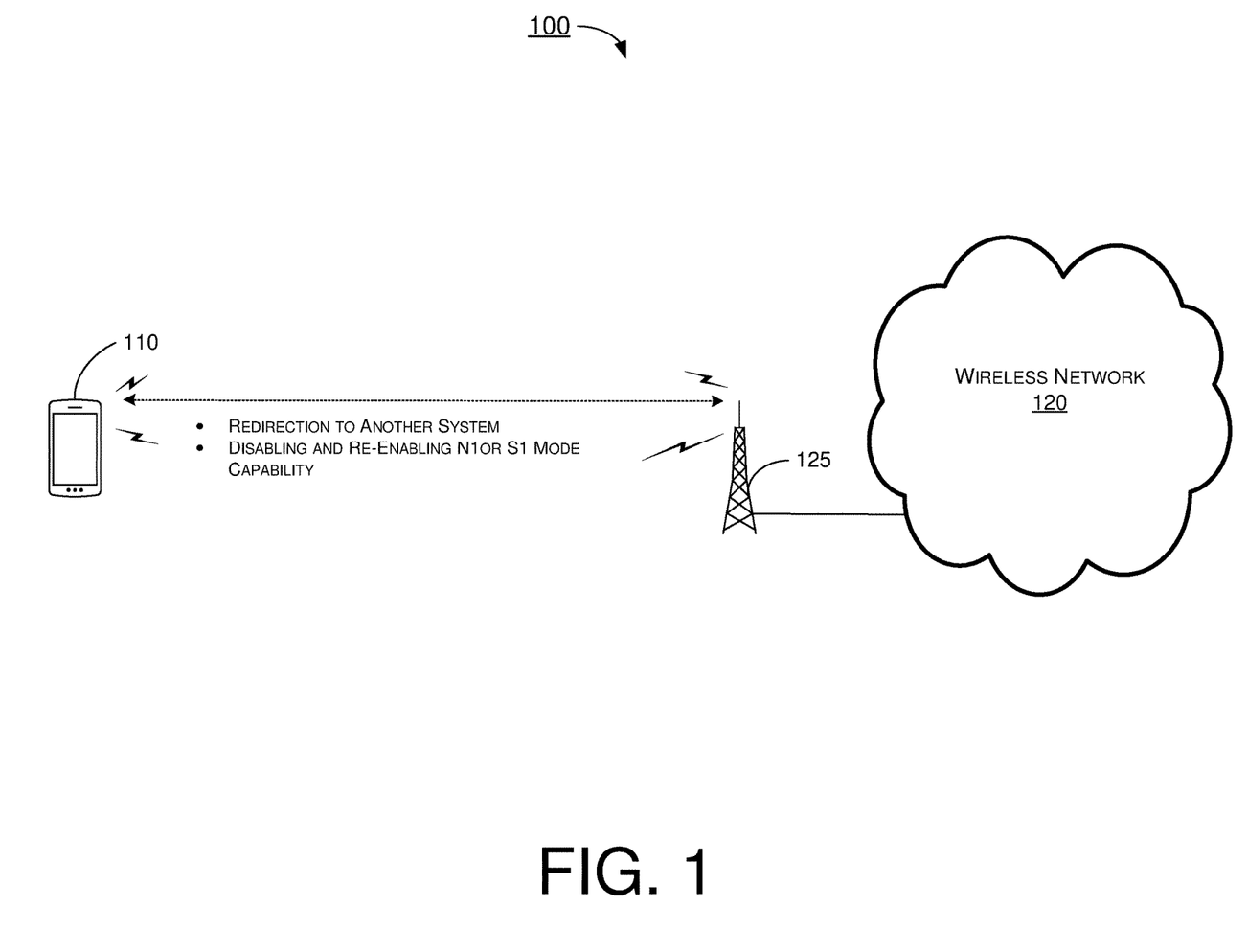
FIG. 1 is a diagram of an example network environment in which various solutions and schemes in accordance with the present disclosure may be implemented.

FIG. 1 illustrates an example network environment 100 in which various solutions and schemes in accordance with the present disclosure may be implemented. Referring to FIG. 1, network environment 100 may involve a UE 110 in wireless communication with a wireless network 120 (e.g., a 5G NR mobile network) as part of a PLMN. UE 110 may initially be in wireless communication with wireless network 120 via a base station or network node 125 (e.g., an eNB, gNB or transmit-receive point (TRP)). In network environment 100, UE 110 and wireless network 120 may implement various schemes pertaining to protocol improvement for redirection to another system in mobile communications in accordance with the present disclosure, as described herein.

Under a first proposed scheme in accordance with the present disclosure, UE 110 may memorize where it received cause #31 by storing certain piece(s) of information associated with the network or cell from where UE 110 received the cause #31. Under the proposed scheme, UE 110 may store information such as: the PLMN, the PLMN plus the system, or the PLMN plus radio access technology (RAT) that represents or indicates the system (e.g., E-UTRAN, which is associated with EPS, or next generation radio access network (NG-RAN) e.g. E-UTRA, E-UTRA by NB-IoT or NR radio, which is associated with 5GS). In 5GS, UE 110 may store or otherwise memorize the information by adding the PLMN to a system-specific forbidden PLMN list (e.g., blacklist) that is applicable when UE 110 uses 5GS services with control plan CIoT 5GS optimization. In such cases, UE 110 may eventually empty the blacklist by power-off or upon expiry of a timer. In case the cause #31 is received from the same PLMN in both EPS and 5GS, the PLMN may be added to a normal "forbidden PLMN list" in UE 110. However, UE 110 may need to consider that cause #31 is meant to be used to indicate that "the network does not offer CIoT service" for UE 110 (e.g., the PLMN needs to be removed from the "forbidden PLMN list") in case UE 110 is further configured to refrain from using CIoT optimization. Moreover, UE 110 may consider a new list (e.g., blacklist) when selecting a PLMN to avoid selecting a PLMN-plus-system combination which does not provide a requested service. In such cases, UE 110 may still select the same PLMN-plus-system combination when no other PLMN is available. In case that UE 110 camps on a cell which belongs to a PLMN in access that transmitted the reject cause #31, UE 110 may enter a predefined state or mote (e.g., LIMITED-SERVICE, NO-CELL-AVAILABLE, or NON-ALLOWED-SERVICE state).

Under a second proposed scheme in accordance with the present disclosure, UE 110 may use a forbidden tracking area (TA) list with some changes to be applicable for cause #31. For instance, one option may be for UE 110 to store TA(s) where cause #31 was received in a "forbidden tracking areas for roaming" list. However, this option may not be optimal because the service is unavailable in the entire PLMN in that access, meaning that in the end each TA of the PLMN may be added to the list. Under this proposed scheme, there may be a new parameter for indicating that a TA is added in the list because of receipt of cause #31. This proposed scheme may need to be adopted by the 3GPP for both 5GS and EPS to ensure symmetric protocols as well as symmetric UE and network behaviors.

Under a third proposed scheme in accordance with the present disclosure, to prevent UE 110 from selecting a wrong system in a PLMN, UE 110 may, in using CIoT optimizations, be pre-configured (e.g., with the mobile equipment (ME) and/or universal integrated circuit card (UICC) configured) with a list of network and EPS/5GS information to steer UE 110 in selecting the appropriate system in a given PLMN. Under the proposed scheme, the pre-configured list may be a type of whitelist that includes information of networks/systems that are preferable for UE 110 such as: the PLMN, the PLMN plus the system, or the PLMN plus RAT that represents or indicates the system (e.g., E-UTRAN, which is associated with EPS, or NG-RAN, which is associated with 5GS). The pre-configured list may also be a type of blacklist that indicates PLMN+system/RAT that are not preferred for UE 110. In case that a new list would be introduced, such a new list may be denoted as, for example, "Operator Controlled PLMN Selector with Access Technology for CIoT optimization." One of the existing PLMN selector lists may be reused for pre-configuration purpose, for instance, by modifying the purpose/usage of the list better for CIoT optimization (e.g., either (1) User Controlled PLMN Selector with Access Technology, or (2) Operator Controlled PLMN Selector with Access Technology). For instance, in case a network/PLMN rejects UE 110 the access to EPS, UE 110 may store PLMN+NG-RAN pair in the "user controlled PLMN selector with access technology" list, in order to prefer 5GS in case of visiting the network. Optionally, this information may also hint UE 110 to use CIoT optimization by not selecting EPS (e.g., E-UTRAN RAT in EPS) in this PLMN even if available. The operator may add PLMN+NG-RAN in the "operator controlled PLMN selector with access technology" list to steer UE 110 in selecting the appropriate system (e.g., 5GS in this example) in the PLMN. Optionally, this information may also hint UE 110 to use CIoT optimization by not selecting EPS (e.g., E-UTRAN RAT in EPS) in this PLMN even if available.

Under a fourth proposed scheme in accordance with the present disclosure, different actions may be taken depending on whether UE 110 is in a 5GS or an EPS. In 5GS, in case network 120 has sent a reject cause #31 to UE 110 in a 5GS system (e.g., "Redirection to EPC required"), then UE 110 may disable N1 mode capability. Additionally, UE 110 may not re-enable the N1 mode capability after not finding a suitable cell connected to an EPC in a PLMN while in S1 mode. Moreover, UE 110 may re-enable the N1 mode capability after a predetermined duration of time has passed (e.g., expiry of a timer) or after UE 110 is powered off and back on again or after removal of a universal subscriber identity module (USIM). Furthermore, UE 110 may re-enable the N1 mode capability in case UE 110 selects another PLMN.

Under the proposed scheme, when UE 110 disables the N1 mode (5G) capability upon receiving reject cause #31 "Redirection to EPC required" and certain predefined conditions are met, UE 110 may enter a limited-service state for 3GPP access and start a timer Txy. The timer Txy may be stopped when lower layers can find either of the following: (1) a suitable NB-IoT cell connected to EPC (S1 mode) which supports CIoT EPS optimizations that are supported by UE 110; or (2) a suitable NB-IoT cell connected to 5GCN which supports CIoT 5GS optimizations that are supported by UE 110 from a PLMN other than a previously registered PLMN. The predefined conditions may include: (a) lower layers cannot find a suitable NB-IoT cell connected to EPC (S1 mode) or there is no suitable NB-IoT cell connected to EPC (S1 mode) which supports CIoT EPS optimizations that are supported by UE 110; and (b) lower layers cannot find a suitable NB-IoT cell connected to 5GCN or there is no suitable NB-IoT cell connected to 5GCN which supports CIoT 5GS optimizations that are supported by UE 110 from a PLMN other than the previously registered PLMN. In an event that lower layers cannot find a suitable NB-IoT cell connected to EPC (S1 mode) or there is no suitable NB-IoT cell connected to EPC (S1 mode) which supports CIoT EPS optimizations that are supported by UE 110 and UE 110 selects a suitable NB-IoT cell connected to 5GCN from a PLMN other than the previously registered PLMN as well as the cell supports CIoT 5GS optimizations that are supported by UE 110, then UE 110 may re-enable the N1 mode capability for 3GPP access and proceed with the appropriate 5GMM procedure. Moreover, UE 110 may be allowed to re-enable the N1 mode capability at expiry of the timer Txy.

In EPS, in case network 120 has sent a reject cause #31 to UE 110 in an EPS (e.g., "Redirection to 5GCN required"), then UE 110 may disable S1 mode capability. Additionally, UE 110 may not re-enable the S1 mode capability after not finding a suitable cell connected to a 5GCN while in N1 mode. Moreover, UE 110 may re-enable the S1 mode capability after a predetermined duration of time has passed (e.g., expiry of a timer) or after UE 110 is powered off and back on again or after removal of a USIM. Furthermore, UE 110 may re-enable the S1 mode capability in case UE 110 selects another PLMN.

Under the proposed scheme, when UE 110 disables the N1 mode (5G) capability upon receiving reject cause #31 "Redirection to EPC required" and certain predefined conditions are met, UE 110 may enter a limited-service state for 3GPP access and start the timer Txy. The predefined conditions may include: (a) lower layers cannot find a suitable NB-IoT cell connected to EPC (S1 mode) or there is no suitable NB-IoT cell connected to EPC (S1 mode) which supports CIoT EPS optimizations that are supported by UE 110; and (b) lower layers cannot find a suitable NB-IoT cell connected to 5GCN or there is no suitable NB-IoT cell connected to 5GCN which supports CIoT 5GS optimizations that are supported by UE 110 from a PLMN other than a previously registered PLMN. In an event that lower layers cannot find a suitable NB-IoT cell connected to EPC (S1 mode) or there is no suitable NB-IoT cell connected to EPC (S1 mode) which supports CIoT EPS optimizations that are supported by UE 110 and UE 110 can find a suitable NB-IoT cell connected to 5GCN which supports CIoT 5GS optimizations that are supported by UE 110 from a PLMN other than the previously registered PLMN as well as the cell, then UE 110 may re-enable the N1 mode capability for 3GPP access and proceed with the appropriate 5GMM procedure.

As an illustrative example of implementation of the fourth proposed scheme, when UE 110 disables its N1 mode capability upon receiving a reject cause #31 "Redirection to EPC required" when UE 110 is in a narrowband N1 (NB-N1) mode, UE 110 may perform different operations depending on one or more conditions. For instance, in an event that lower layers of UE 110 do not provide an indication that a current E-UTRA cell is connected to an EPC or in an event that lower layers of UE 110 do not provide an indication that the current E-UTRA cell supports CIoT EPS optimizations that are supported by UE 110, then UE 110 may search for a suitable NB-IoT cell connected to the EPC (e.g., according to 3GPP Technical Specification (TS) 36.304). Alternatively, in an event that lower layers of UE 110 provide an indication that the current E-UTRA cell is connected to an EPC and the current E-UTRA cell supports CIoT EPS optimizations that are supported by UE 110, then UE 110 may perform a core network selection to select the EPC. Still alternatively, in an event that lower layers of UE 110 cannot find a suitable NB-IoT cell connected to an EPC or there is no suitable NB-IoT cell connected to the EPC which supports CIoT EPS optimizations that are supported by UE 110, then UE 110 may indicate to the lower layers to remain camped in the E-UTRA cell connected to 5GCN and UE 110 may then start an implementation-specific timer and enter the state 5GMM-REGISTERED.LIMITED-SERVICE. UE 110 may re-enable the N1 mode capability for 3GPP access at expiry of the implementation-specific timer, in case the timer has been started, and UE 110 may then proceed with an appropriate 5GMM procedure.

As another illustrative example of implementation of the fourth proposed scheme, when UE 110 disables its N1 mode capability upon receiving a reject cause #31 "Redirection to EPC required" when UE 110 is in a wideband N1 (WB-N1) mode, UE 110 may perform different operations depending on one or more conditions. For instance, in an event that lower layers of UE 110 do not provide an indication that a current E-UTRA cell is connected to an EPC or in an event that lower layers of UE 110 do not provide an indication that the current E-UTRA cell supports CIoT EPS optimizations that are supported by UE 110, then UE 110 may search for a suitable E-UTRA cell connected to the EPC (e.g., according to 3GPP TS 36.304). Alternatively, in an event that lower layers of UE 110 provide an indication that the current E-UTRA cell is connected to an EPC and the current E-UTRA cell supports CIoT EPS optimizations that are supported by UE 110, then UE 110 may perform a core network selection to select the EPC.

Still alternatively, in an event that lower layers of UE 110 cannot find a suitable E-UTRA cell connected to an EPC or there is no suitable E-UTRA cell connected to the EPC which supports CIoT EPS optimizations that are supported by UE 110, then UE 110 may indicate to the lower layers to remain camped in the E-UTRA cell connected to 5GCN and UE 110 may then start an implementation-specific timer and enter the state 5GMM-REGISTERED.LIMITED-SERVICE. UE 110 may re-enable the N1 mode capability for 3GPP access at expiry of the implementation-specific timer, in case the timer has been started, and UE 110 may then proceed with an appropriate 5GMM procedure.

Illustrative Implementations

Figure 2:
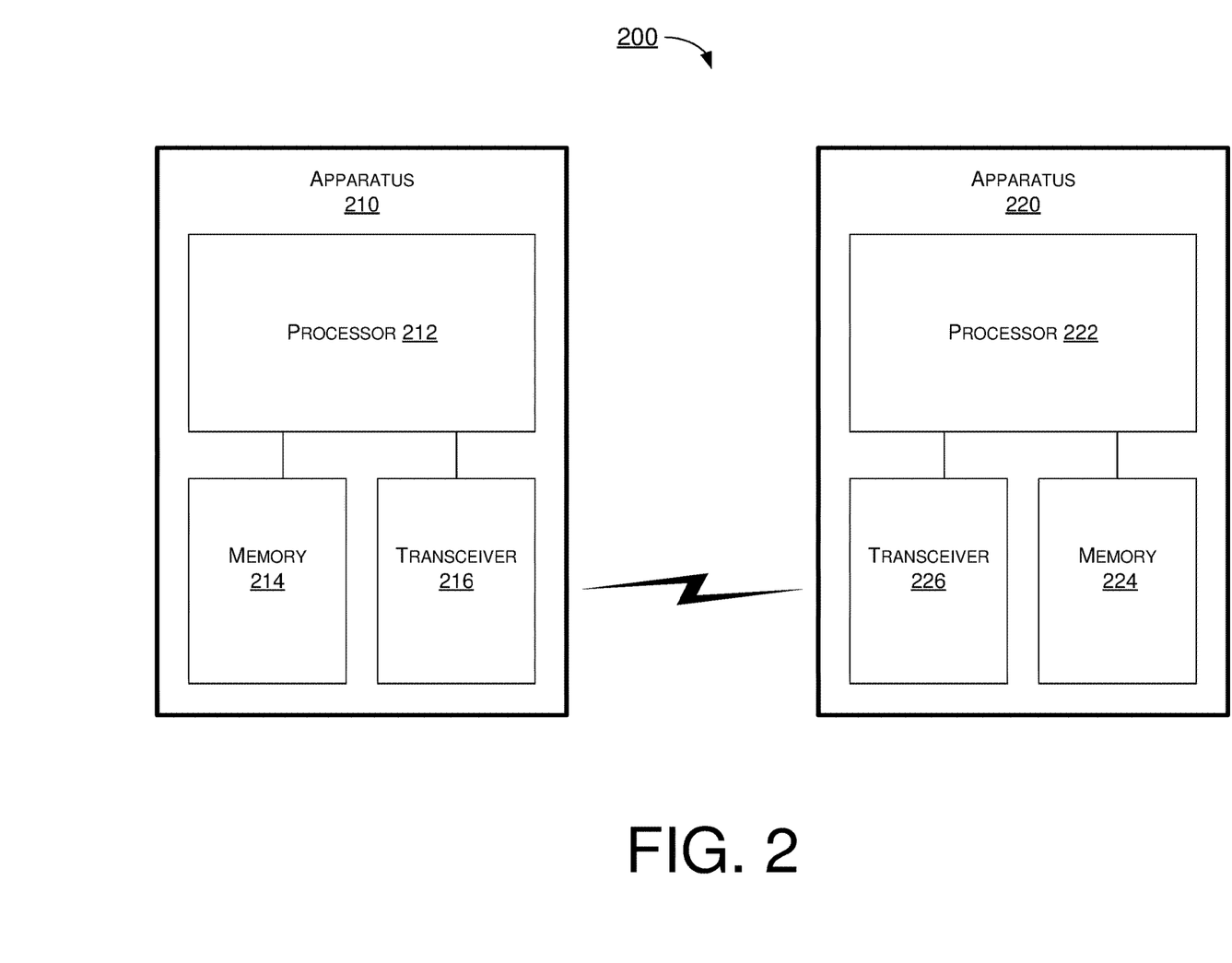
FIG. 2 is a block diagram of an example communication system in accordance with an implementation of the present disclosure.

FIG. 2 illustrates an example communication system 200 having at least an example apparatus 210 and an example apparatus 220 in accordance with an implementation of the present disclosure. Each of apparatus 210 and apparatus 220 may perform various functions to implement schemes, techniques, processes and methods described herein pertaining to protocol improvement for redirection to another system in mobile communications, including the various schemes described above with respect to various proposed designs, concepts, schemes, systems and methods described above, including network environment 100, as well as processes described below.

Each of apparatus 210 and apparatus 220 may be a part of an electronic apparatus, which may be a network apparatus or a UE (e.g., UE 110), such as a portable or mobile apparatus, a wearable apparatus, a vehicular device or a vehicle, a wireless communication apparatus or a computing apparatus. For instance, each of apparatus 210 and apparatus 220 may be implemented in a smartphone, a smart watch, a personal digital assistant, an electronic control unit (ECU) in a vehicle, a digital camera, or a computing equipment such as a tablet computer, a laptop computer or a notebook computer. Each of apparatus 210 and apparatus 220 may also be a part of a machine type apparatus, which may be an IoT apparatus such as an immobile or a stationary apparatus, a home apparatus, a roadside unit (RSU), a wire communication apparatus or a computing apparatus. For instance, each of apparatus 210 and apparatus 220 may be implemented in a smart thermostat, a smart fridge, a smart door lock, a wireless speaker or a home control center. When implemented in or as a network apparatus, apparatus 210 and/or apparatus 220 may be implemented in an eNodeB in an LTE, LTE-Advanced or LTE-Advanced Pro network or in a gNB or TRP in a 5G network, an NR network or an IoT network.

In some implementations, each of apparatus 210 and apparatus 220 may be implemented in the form of one or more integrated-circuit (IC) chips such as, for example and without limitation, one or more single-core processors, one or more multi-core processors, one or more complex-instruction-set-computing (CISC) processors, or one or more reduced-instruction-set-computing (RISC) processors. In the various schemes described above, each of apparatus 210 and apparatus 220 may be implemented in or as a network apparatus or a UE. Each of apparatus 210 and apparatus 220 may include at least some of those components shown in FIG. 2 such as a processor 212 and a processor 222, respectively, for example. Each of apparatus 210 and apparatus 220 may further include one or more other components not pertinent to the proposed scheme of the present disclosure (e.g., internal power supply, display device and/or user interface device), and, thus, such component(s) of apparatus 210 and apparatus 220 are neither shown in FIG. 2 nor described below in the interest of simplicity and brevity.

In one aspect, each of processor 212 and processor 222 may be implemented in the form of one or more single-core processors, one or more multi-core processors, or one or more CISC or RISC processors. That is, even though a singular term "a processor" is used herein to refer to processor 212 and processor 222, each of processor 212 and processor 222 may include multiple processors in some implementations and a single processor in other implementations in accordance with the present disclosure. In another aspect, each of processor 212 and processor 222 may be implemented in the form of hardware (and, optionally, firmware) with electronic components including, for example and without limitation, one or more transistors, one or more diodes, one or more capacitors, one or more resistors, one or more inductors, one or more memristors and/or one or more varactors that are configured and arranged to achieve specific purposes in accordance with the present disclosure. In other words, in at least some implementations, each of processor 212 and processor 222 is a special-purpose machine specifically designed, arranged and configured to perform specific tasks including those pertaining to protocol improvement for redirection to another system in mobile communications in accordance with various implementations of the present disclosure.

In some implementations, apparatus 210 may also include a transceiver 216 coupled to processor 212. Transceiver 216 may be capable of wirelessly transmitting and receiving data. In some implementations, transceiver 216 may be capable of wirelessly communicating with different types of wireless networks of different radio access technologies (RATs). In some implementations, transceiver 216 may be equipped with a plurality of antenna ports (not shown) such as, for example, four antenna ports. That is, transceiver 216 may be equipped with multiple transmit antennas and multiple receive antennas for multiple-input multiple-output (MIMO) wireless communications. In some implementations, apparatus 220 may also include a transceiver 226 coupled to processor 222. Transceiver 226 may include a transceiver capable of wirelessly transmitting and receiving data. In some implementations, transceiver 226 may be capable of wirelessly communicating with different types of UEs/wireless networks of different RATs. In some implementations, transceiver 226 may be equipped with a plurality of antenna ports (not shown) such as, for example, four antenna ports. That is, transceiver 226 may be equipped with multiple transmit antennas and multiple receive antennas for MIMO wireless communications.

In some implementations, apparatus 210 may further include a memory 214 coupled to processor 212 and capable of being accessed by processor 212 and storing data therein. In some implementations, apparatus 220 may further include a memory 224 coupled to processor 222 and capable of being accessed by processor 222 and storing data therein. Each of memory 214 and memory 224 may include a type of random-access memory (RAM) such as dynamic RAM (DRAM), static RAM (SRAM), thyristor RAM (T-RAM) and/or zero-capacitor RAM (Z-RAM). Alternatively, or additionally, each of memory 214 and memory 224 may include a type of read-only memory (ROM) such as mask ROM, programmable ROM (PROM), erasable programmable ROM (EPROM) and/or electrically erasable programmable ROM (EEPROM). Alternatively, or additionally, each of memory 214 and memory 224 may include a type of non-volatile random-access memory (NVRAM) such as flash memory, solid-state memory, ferroelectric RAM (Fe-RAM), magnetoresistive RAM (MRAM) and/or phase-change memory.

Each of apparatus 210 and apparatus 220 may be a communication entity capable of communicating with each other using various proposed schemes in accordance with the present disclosure. For illustrative purposes and without limitation, a description of capabilities of apparatus 210, as a UE (e.g., UE 110), and apparatus 220, as a network node (e.g., network node 125) of a wireless network (e.g., wireless network 120 as a 5G/NR mobile network), is provided below.

In one aspect of protocol improvement for redirection to another system in mobile communications in accordance with the present disclosure, processor 212 of apparatus 210 in a 5GS, implemented in or as UE 110, may receive, via transceiver 216, from apparatus 220 as a network node of a mobile network (e.g., network node 125 of wireless network 120) a reject cause indicating that redirection to an EPS is required. Additionally, in response to receiving the reject cause while no suitable cell of the first mobile network connected to an EPC is found or while no cell of the first mobile network connected to an EPC can be selected, processor 212 may enter a predefined 5GMM state and start a timer (e.g., timer Txy described above).

In some implementations, the predefined 5GMM state may be a limited-service state (e.g., 5GMM-REGISTERED.LIMITED-SERVICE state).

In some implementations, processor 212 may start an appropriate 5GMM procedure at expiry of the timer In some implementations, processor 212 may disable an N1 mode capability responsive to receiving the reject cause. Additionally, processor 212 may re-enable the N1 mode capability in response to apparatus 210 having been powered off and then powered back on.

In some implementations, processor 212 may disable an N1 mode capability responsive to receiving the reject cause. Additionally, processor 212 may re-enable the N1 mode capability in response to a USIM of apparatus 210 having been removed.

In some implementations, processor 212 may also stop the timer in response to finding the following: (a) a suitable cell connected to the EPC which supports CIoT EPS optimizations that are supported by apparatus 210; or (b) a suitable cell connected to a 5GCN which supports CIoT 5GS optimizations that are supported by apparatus 210 from a PLMN other than a previously registered PLMN.

In some implementations, processor 212 may disable an N1 mode capability responsive to receiving the reject cause. Additionally, processor 212 may re-enable the N1 mode capability for a 3GPP access in response to: (a) a suitable cell connected to the EPC not being found or there being no suitable cell connected to the EPC which supports CIoT EPS optimizations that are supported by apparatus 210; and (b) apparatus 210 selecting a suitable cell connected to a 5GCN which supports CIoT 5GS optimizations that are supported by apparatus 210 from a PLMN other than a previously registered PLMN.

In some implementations, processor 212 may disable an N1 mode capability responsive to receiving the reject cause. Additionally, processor 212 may re-enable the N1 mode capability if not already enabled at latest upon expiry of the timer.

In another aspect of protocol improvement for redirection to another system in mobile communications in accordance with the present disclosure, processor 212 of apparatus 210 in an EPS, implemented in or as UE 110, may receive, via transceiver 216, from apparatus 220 as a network node of a mobile network (e.g., network node 125 of wireless network 120) a reject cause indicating that redirection to a 5GS is required. Additionally, in response to receiving the reject cause while no suitable cell of the first mobile network connected to a 5GCN is found or while no cell of the first mobile network connected to a 5GCN can be selected, processor 212 may enter a predefined EMM state and start a timer (e.g., timer Txy described above).

In some implementations, the predefined EMM state may be a limited-service state (e.g., EMM-REGISTERED.LIMITED-SERVICE state).

In some implementations, processor 212 may start an appropriate EMM procedure at expiry of the timer.

In some implementations, processor 212 may disable an S1 mode capability responsive to receiving the reject cause. Additionally, processor 212 may re-enable the S1 mode capability in response to a USIM of apparatus 210 having been removed.

In some implementations, processor 212 may disable an S1 mode capability responsive to receiving the reject cause. Additionally, processor 212 may re-enable the S1 mode capability in response to a second mobile network having been selected for connection by apparatus 210.

In some implementations, processor 212 may also stop the timer in response to finding: (a) a suitable cell connected to an EPC which supports CIoT EPS optimizations that are supported by apparatus 210; or (b) a suitable cell connected to the 5GCN which supports CIoT 5GS optimizations that are supported by apparatus 210 from a PLMN other than a previously registered PLMN.

In some implementations, processor 212 may disable an S1 mode capability responsive to receiving the reject cause.

Additionally, processor 212 may re-enable the S1 mode capability for a 3GPP access in response to: (a) a suitable cell connected to an EPC not being found or there being no suitable cell connected to the EPC which supports CIoT EPS optimizations that are supported by apparatus 210; and (b) apparatus 210 selecting a suitable cell connected to the 5GCN which supports CIoT 5GS optimizations that are supported by apparatus 210 from a PLMN other than a previously registered PLMN.

In some implementations, processor 212 may disable an S1 mode capability responsive to receiving the reject cause. Additionally, processor 212 may re-enable the S1 mode capability if not already enabled at latest upon expiry of the timer.

Illustrative Processes

Figure 3:
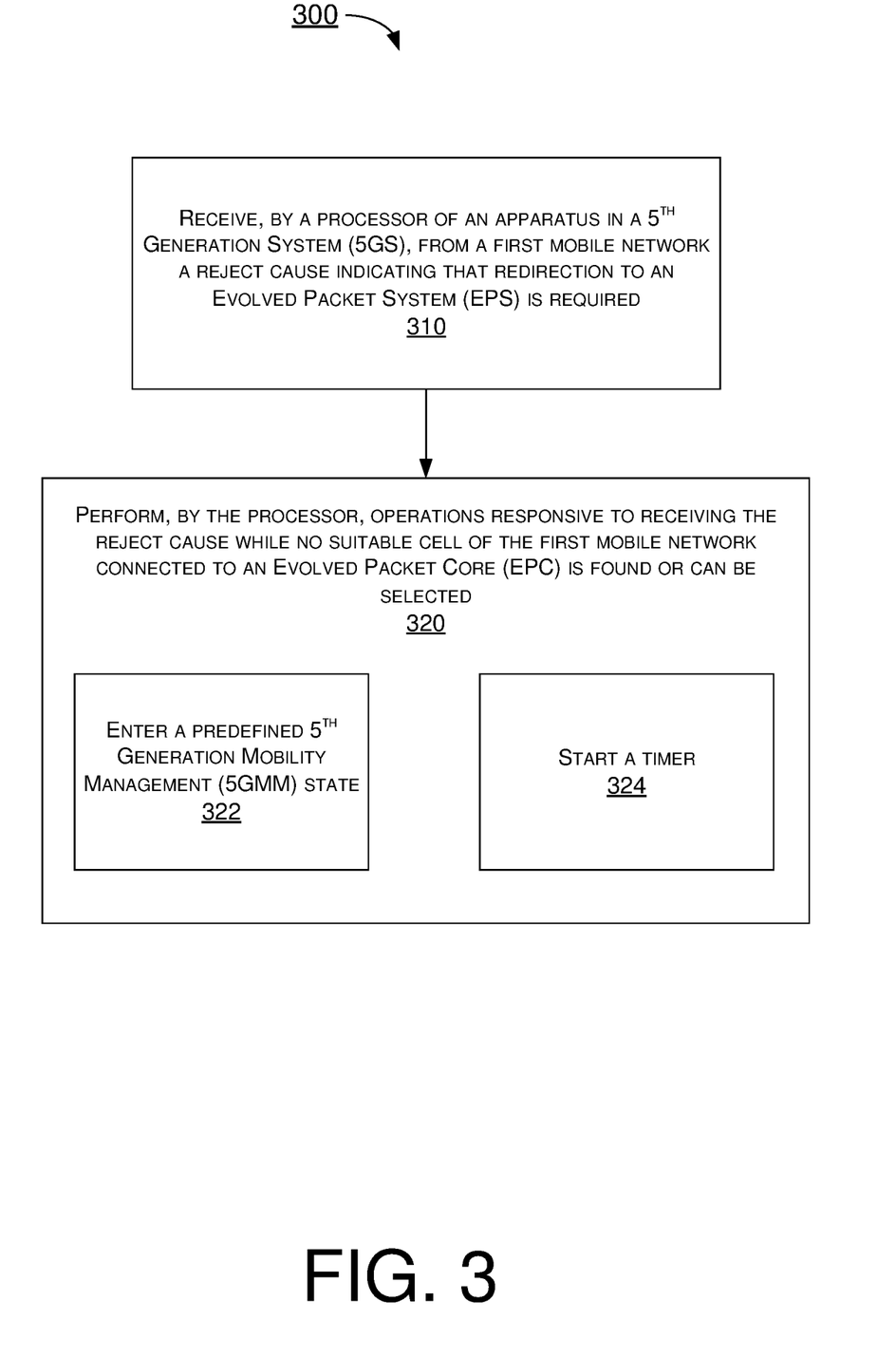
FIG. 3 is a flowchart of an example process in accordance with an implementation of the present disclosure.

FIG. 3 illustrates an example process 300 in accordance with an implementation of the present disclosure. Process 300 may represent an aspect of implementing various proposed designs, concepts, schemes, systems and methods described above, whether partially or entirely, including those pertaining to those described above. More specifically, process 300 may represent an aspect of the proposed concepts and schemes pertaining to protocol improvement for redirection to another system in mobile communications. Process 300 may include one or more operations, actions, or functions as illustrated by one or more of blocks 310 and 320 as well as sub-blocks 322 and 324. Although illustrated as discrete blocks, various blocks of process 300 may be divided into additional blocks, combined into fewer blocks, or eliminated, depending on the desired implementation. Moreover, the blocks/sub-blocks of process 300 may be executed in the order shown in FIG. 3 or, alternatively in a different order. Furthermore, one or more of the blocks/sub-blocks of process 300 may be executed iteratively. Process 300 may be implemented by or in apparatus 210 and apparatus 220 as well as any variations thereof. Solely for illustrative purposes and without limiting the scope, process 300 is described below in the context of apparatus 210 as a UE (e.g., UE 110) and apparatus 220 as a communication entity such as a network node or base station (e.g., network node 125) of a wireless network (e.g., wireless network 120). Process 300 may begin at block 310.

At 310, process 300 may involve processor 212 of apparatus 210 in a 5GS, implemented in or as UE 110, receiving, via transceiver 216, from apparatus 220 as a network node of a mobile network (e.g., network node 125 of wireless network 120) a reject cause indicating that redirection to an EPS is required. Process 300 may proceed from 310 to 320.

At 320, process 300 may involve processor 212 performing certain operations, represented by 322 and 324, in response to receiving the reject cause while no suitable cell of the first mobile network connected to an EPC is found or while no cell of the first mobile network connected to an EPC can be selected.

At 322, process 300 may involve processor 212 entering a predefined 5GMM state.

At 324, process 300 may involve processor 212 starting a timer (e.g., timer Txy described above).

In some implementations, the predefined 5GMM state may be a limited-service state (e.g., 5GMM-REGISTERED.LIMITED-SERVICE state).

In some implementations, process 300 may further involve processor 212 starting an appropriate 5GMM procedure at expiry of the timer.

In some implementations, process 300 may further involve processor 212 disabling an N1 mode capability responsive to receiving the reject cause. Additionally, process 300 may involve processor 212 re-enabling the N1 mode capability in response to a USIM of apparatus 210 having been removed.

In some implementations, process 300 may further involve processor 212 disabling an N1 mode capability responsive to receiving the reject cause. Additionally, process 300 may involve processor 212 re-enabling the N1 mode capability in response to a second mobile network having been selected for connection by apparatus 210.

In some implementations, process 300 may further involve processor 212 stopping the timer in response to finding the following: (a) a suitable cell connected to the EPC which supports CIoT EPS optimizations that are supported by apparatus 210; or (b) a suitable cell connected to a 5GCN which supports CIoT 5GS optimizations that are supported by apparatus 210 from a PLMN other than a previously registered PLMN.

In some implementations, process 300 may further involve processor 212 disabling an N1 mode capability responsive to receiving the reject cause. Additionally, process 300 may involve processor 212 re-enabling the N1 mode capability for a 3GPP access in response to: (a) a suitable cell connected to the EPC not being found or there being no suitable cell connected to the EPC which supports CIoT EPS optimizations that are supported by apparatus 210; and (b) apparatus 210 selecting a suitable cell connected to a 5GCN which supports CIoT 5GS optimizations that are supported by apparatus 210 from a PLMN other than a previously registered PLMN.

In some implementations, process 300 may further involve processor 212 disabling an N1 mode capability responsive to receiving the reject cause. Additionally, process 300 may involve processor 212 re-enabling the N1 mode capability if not already enabled at latest upon expiry of the timer.

Figure 4:
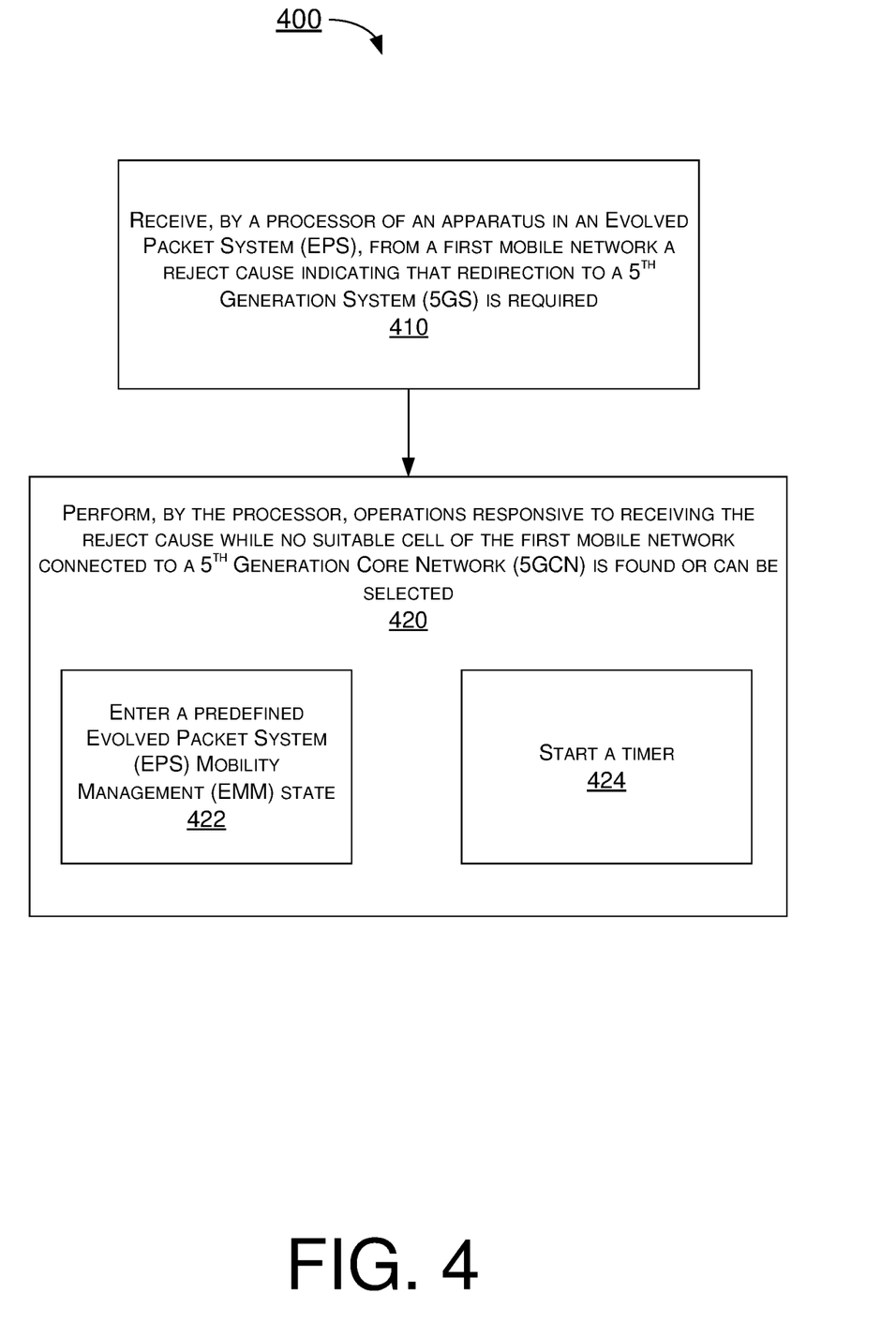
FIG. 4 is a flowchart of an example process in accordance with an implementation of the present disclosure.

FIG. 4 illustrates an example process 400 in accordance with an implementation of the present disclosure. Process 400 may represent an aspect of implementing various proposed designs, concepts, schemes, systems and methods described above, whether partially or entirely, including those pertaining to those described above. More specifically, process 400 may represent an aspect of the proposed concepts and schemes pertaining to protocol improvement for redirection to another system in mobile communications. Process 400 may include one or more operations, actions, or functions as illustrated by one or more of blocks 410 and 420 as well as sub-blocks 422 and 424. Although illustrated as discrete blocks, various blocks of process 400 may be divided into additional blocks, combined into fewer blocks, or eliminated, depending on the desired implementation. Moreover, the blocks/sub-blocks of process 400 may be executed in the order shown in FIG. 4 or, alternatively in a different order. Furthermore, one or more of the blocks/sub-blocks of process 400 may be executed iteratively. Process 400 may be implemented by or in apparatus 210 and apparatus 220 as well as any variations thereof. Solely for illustrative purposes and without limiting the scope, process 400 is described below in the context of apparatus 210 as a UE (e.g., UE 110) and apparatus 220 as a communication entity such as a network node or base station (e.g., network node 125) of a wireless network (e.g., wireless network 120). Process 400 may begin at block 410.

At 410, process 400 may involve processor 212 of apparatus 210 in an EPS, implemented in or as UE 110, receiving, via transceiver 216, from apparatus 220 as a network node of a mobile network (e.g., network node 125 of wireless network 120) a reject cause indicating that redirection to a 5GS is required. Process 400 may proceed from 410 to 420.

At 420, process 400 may involve processor 212 performing certain operations, represented by 422 and 424, in response to receiving the reject cause while no suitable cell of the first mobile network connected to a 5GCN is found or while no cell of the first mobile network connected to a 5GCN can be selected.

At 422, process 400 may involve processor 212 entering a predefined EMM state.

At 424, process 400 may involve processor 212 starting a timer (e.g., timer Txy described above).

In some implementations, the predefined EMM state may be a limited-service state (e.g., EMM-REGISTERED.LIMITED-SERVICE state).

In some implementations, process 400 may further involve processor 212 starting an appropriate EMM procedure at expiry of the timer.

In some implementations, process 400 may further involve processor 212 disabling an S1 mode capability responsive to receiving the reject cause. Additionally, process 400 may involve processor 212 re-enabling the S1 mode capability in response to a USIM of apparatus 210 having been removed.

In some implementations, process 400 may further involve processor 212 disabling an S1 mode capability responsive to receiving the reject cause. Additionally, process 400 may involve processor 212 re-enabling the S1 mode capability in response to a second mobile network having been selected for connection by apparatus 210.

In some implementations, process 400 may further involve processor 212 stopping the timer in response to finding: (a) a suitable cell connected to an EPC which supports CIoT EPS optimizations that are supported by apparatus 210; or (b) a suitable cell connected to the 5GCN which supports CIoT 5GS optimizations that are supported by apparatus 210 from a PLMN other than a previously registered PLMN.

In some implementations, process 400 may further involve processor 212 disabling an S1 mode capability responsive to receiving the reject cause. Additionally, process 400 may involve processor 212 re-enabling the S1 mode capability for a 3GPP access in response to: (a) a suitable cell connected to an EPC not being found or there being no suitable cell connected to the EPC which supports CIoT EPS optimizations that are supported by apparatus 210; and (b) apparatus 210 selecting a suitable cell connected to the 5GCN which supports CIoT 5GS optimizations that are supported by apparatus 210 from a PLMN other than a previously registered PLMN.

In some implementations, process 400 may further involve processor 212 disabling an S1 mode capability responsive to receiving the reject cause. Additionally, process 400 may involve processor 212 re-enabling the S1 mode capability if not already enabled at latest upon expiry of the timer.

Additional Notes

The herein-described subject matter sometimes illustrates different components contained within, or connected with, different other components. It is to be understood that such depicted architectures are merely examples, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

Further, with respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

Moreover, it will be understood by those skilled in the art that, in general, terms used herein, and especially in the appended claims, e.g., bodies of the appended claims, are generally intended as "open" terms, e.g., the term "including" should be interpreted as "including but not limited to," the term "having" should be interpreted as "having at least," the term "includes" should be interpreted as "includes but is not limited to," etc. It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to implementations containing only one such recitation, even when the same claim includes the introductory phrases "one or more" or "at least one" and indefinite articles such as "a" or "an," e.g., "a" and/or "an" should be interpreted to mean "at least one" or "one or more;" the same holds true for the use of definite articles used to introduce claim recitations. In addition, even if a specific number of an introduced claim recitation is explicitly recited, those skilled in the art will recognize that such recitation should be interpreted to mean at least the recited number, e.g., the bare recitation of "two recitations," without other modifiers, means at least two recitations, or two or more recitations. Furthermore, in those instances where a convention analogous to "at least one of A, B, and C, etc." is used, in general such a construction is intended in the sense one having skill in the art would understand the convention, e.g., "a system having at least one of A, B, and C" would include but not be limited to systems that have A alone, B alone, C alone, A and B together, A and C together, B and C together, and/or A, B, and C together, etc. In those instances where a convention analogous to "at least one of A, B, or C, etc." is used, in general such a construction is intended in the sense one having skill in the art would understand the convention, e.g., "a system having at least one of A, B, or C" would include but not be limited to systems that have A alone, B alone, C alone, A and B together, A and C together, B and C together, and/or A, B, and C together, etc. It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

From the foregoing, it will be appreciated that various implementations of the present disclosure have been described herein for purposes of illustration, and that various modifications may be made without departing from the scope and spirit of the present disclosure. Accordingly, the various implementations disclosed herein are not intended to be limiting, with the true scope and spirit being indicated by the following claims.

What is claimed is:

1. A method, comprising:
receiving, by a processor of an apparatus in a $5^{th}$ Generation System (5GS), from a first mobile network a reject cause indicating that redirection to an Evolved Packet System (EPS) is required;
responsive to receiving the reject cause while no suitable cell of the first mobile network connected to an Evolved Packet Core (EPC) is found or can be selected, performing, by the processor:
entering a predefined $5^{th}$ Generation Mobility Management (5GMM) state; and
starting a timer; and
performing a first procedure or a second procedure or a third procedure or a fourth procedure,
wherein the first procedure comprises:
disabling, by the processor, an N1 mode capability responsive to receiving the reject cause; and
re-enabling, by the processor, the N1 mode capability responsive to a universal subscriber identity module (USIM) of the apparatus having been removed,
wherein the second procedure comprises:
stopping, by the processor, the timer responsive to finding:
a suitable cell connected to the EPC which supports cellular Internet of Things (CIoT) EPS optimizations that are supported by the apparatus; or
a suitable cell connected to a $5^{th}$ Generation Core Network (5GCN) which supports CIoT 5GS optimizations that are supported by the apparatus from a public land mobile network (PLMN) other than a previously registered PLMN, and
wherein the third procedure comprises:
disabling, by the processor, an N1 mode capability responsive to receiving the reject cause; and
re-enabling, by the processor, the N1 mode capability for a 3rd Generation Partnership Project (3GPP) access responsive to:
a suitable cell connected to the EPC not being found or there being no suitable cell connected to the EPC which supports cellular Internet of Things (CIoT) EPS optimizations that are supported by the apparatus; and
the apparatus selecting a suitable cell connected to a 5th Generation Core Network (5GCN) which supports CIoT 5GS optimizations that are supported by the apparatus from a public land mobile network (PLMN) other than a previously registered PLMN
wherein the fourth procedure comprises:
re-enabling, by the processor, the N1 mode capability if not already enabled upon expiry of the timer.

2. The method of claim 1, wherein the predefined 5GMM state is a limited-service state.

3. The method of claim 1, further comprising:
starting, by the processor, a 5GMM procedure at expiry of the timer.

4. A method, comprising:
receiving, by a processor of an apparatus in an Evolved Packet System (EPS), from a first mobile network a reject cause indicating that redirection to a $5^{th}$ Generation System (5GS) is required;
responsive to receiving the reject cause while no suitable cell of the first mobile network connected to a $5^{th}$ Generation Core Network (5GCN) is found or can be selected, performing, by the processor:
entering a predefined EPS Mobility Management (EMM) state; and
starting a timer; and
performing a first procedure or a second procedure or a third procedure or a fourth procedure,
wherein the first procedure comprises:
disabling, by the processor, an S1 mode capability responsive to receiving the reject cause; and
re-enabling, by the processor, the S1 mode capability responsive to a universal subscriber identity module (USIM) of the apparatus having been removed,
wherein the second procedure comprises:
stopping, by the processor, the timer responsive to finding:
a suitable cell connected to an Evolved Packet Core (EPC) which supports cellular Internet of Things (CIoT) EPS optimizations that are supported by the apparatus; or
a suitable cell connected to the 5GCN which supports CIoT 5GS optimizations that are supported by the apparatus from a public land mobile network (PLMN) other than a previously registered PLMN, and
wherein the third procedure comprises:
disabling, by the processor, an S1 mode capability responsive to receiving the reject cause; and
re-enabling, by the processor, the S1 mode capability for a 3rd Generation Partnership Project (3GPP) access responsive to:
a suitable cell connected to an Evolved Packet Core (EPC) not being found or there being no suitable cell connected to the EPC which supports cellular Internet of Things (CIoT) EPS optimizations that are supported by the apparatus; and
the apparatus selecting a suitable cell connected to the 5GCN which supports CIoT 5GS optimizations that are supported by the apparatus from a public land mobile network (PLMN) other than a previously registered PLMN; or
wherein the fourth procedure comprises:
re-enabling, by the processor, the S1 mode capability if not already enabled upon expiry of the timer.

5. The method of claim 4, wherein the predefined EMM state is a limited-service state.

6. The method of claim 4, further comprising:
starting, by the processor, an EMM procedure at expiry of the timer.

* * * * *